(12) United States Patent
Ativanichayaphong et al.

(10) Patent No.: US 7,962,343 B2
(45) Date of Patent: *Jun. 14, 2011

(54) METHOD AND SYSTEM OF BUILDING A GRAMMAR RULE WITH BASEFORMS GENERATED DYNAMICALLY FROM USER UTTERANCES

(75) Inventors: Soonthorn Ativanichayaphong, Boca Raton, FL (US); Charles W. Cross, Jr., Wellington, FL (US); Brien H. Muschett, Palm Beach Gardens, FL (US)

(73) Assignee: Nuance Communications, Inc., Burlington, MA (US)

( * ) Notice: Subject to any disclaimer, the term of this patent is extended or adjusted under 35 U.S.C. 154(b) by 150 days.

This patent is subject to a terminal disclaimer.

(21) Appl. No.: 12/276,036

(22) Filed: Nov. 21, 2008

(65) Prior Publication Data

US 2009/0076818 A1 Mar. 19, 2009

Related U.S. Application Data

(63) Continuation of application No. 10/924,520, filed on Aug. 24, 2004, now Pat. No. 7,487,085.

(51) Int. Cl.
*G10L 21/00* (2006.01)

(52) U.S. Cl. .............. 704/270.1; 704/255; 704/257
(58) Field of Classification Search ............ 704/1–10, 704/231, 246, 257, 270, 235, 255, 270.1; 715/239
See application file for complete search history.

(56) References Cited

U.S. PATENT DOCUMENTS 7,185,276 B2 * 2/2007 Keswa .................... 715/239
* cited by examiner

*Primary Examiner* — Huyen X. Vo
(74) *Attorney, Agent, or Firm* — Wolf, Greenfield & Sacks, P.C.

(57) ABSTRACT

A method (200) of building a grammar with baseforms generated dynamically from user utterances can include the steps of recording (205) a user utterance, generating (210) a baseform using the user utterance, creating or adding to (215) a grammar rule using the baseform, and binding (230) the grammar rule in a grammar document of a voice extensible markup language program. Generating a baseform can optionally include introducing a new element to VoiceXML with attributes that enable generating the baseform from a referenced recording such as the user utterance. In one embodiment, the method can be used to create (235) a phonebook and a grammar to access the phonebook by repeatedly visiting a form containing the grammar rule with attributes that enable generating the baseform from the referenced recording.

18 Claims, 2 Drawing Sheets

METHOD AND SYSTEM OF BUILDING A GRAMMAR RULE WITH BASEFORMS GENERATED DYNAMICALLY FROM USER UTTERANCES

CROSS REFERENCE TO RELATED APPLICATIONS

This application is a continuation of, and accordingly claims the benefit of, U.S. patent application Ser. No. 10/924,520, filed with the U.S. Patent and Trademark Office on Aug. 24, 2004, now U.S. Pat. No. 7,487,085.

BACKGROUND OF THE INVENTION

1. Technical Field

This invention relates to the field of voice extensible markup language, and more particularly to a method and system for generating a grammar rule using a referenced recording.

2. Description of the Related Art

Visual browsers are complex application programs that can render graphic markup languages such as Hypertext Markup Language (HTML) or Extensible HTML (XHTML or XML). As such, visual browsers lack the ability to process audible input and/or output. Still, visual browsers enjoy a significant user base.

Voice browsers are the audio counterparts of visual browsers. More particularly, voice browsers can render voice markup languages such as Voice Extensible Markup Language (VXML or VoiceXML), thereby allowing users to interact with the voice browser using speech.

Recent developments in Web-based applications have led to the development of multimodal interfaces. Multimodal interfaces allow users to access multimodal content, or content having both graphical and audible queues. Through a multimodal interface, the user can choose to interact or access content using graphic input such as a keyboard or pointer entry, using an audible queue such as a speech input, or using a combination of both. For example, one variety of multimodal interface is a multimodal browser that can render content written in XHTML Voice markup language, also referred to as X+V markup language.

Voice-enabling content refers to permitting spoken utterances to be utilized as recognizable application input as well as generating spoken output for an application, such as presenting an audible rendition of content contained within an electronic document like a markup language document. Command and control pertains to graphical user interface (GUI) features such as commands that are accessible through menus and dialog boxes of an application. Content navigation pertains to the ability of a user to select hyperlinks presented within a rendered electronic document using voice, thereby causing a browser, for example, to load the document represented by the hyperlink. Thus, to speech enable an application program, efforts not only must be directed to voice-enabling the content, but also to voice-enabling command and control and content navigation functions of the application program.

VoiceXML uses grammars that can be generated from text data available to an application (through a database, webservices, or user input.) However, there is a class of Automatic Speech Recognition (ASR) applications that record lists of user utterances and creates grammars based on dynamically generated acoustic baseforms. An example is a phone dialer application with a phone book where the user can save the names and numbers for people and dial them later with a command like "Dial Brian." The VoiceXML language currently fails to support this application model where a grammar can be built with baseforms generated dynamically from user utterances.

SUMMARY OF THE INVENTION

Embodiments in accordance with the invention can enable a method and system for creating or adjusting preexisting grammars based on dynamically generated acoustic baseforms by adding an element to the VoiceXML language and state variables to the VoiceXML platform in accordance with the present invention.

In a first aspect of the invention, a method of building a grammar with baseforms generated dynamically from user utterances can include the steps of recording a user utterance, generating a baseform using the user utterance, creating a grammar rule using the baseform, and binding the grammar rule in a grammar document of a voice extensible markup language program. Generating a baseform can include introducing a new element to VoiceXML with attributes that enable generating the baseform from a referenced recording such as the user utterance. The method can further include the step of creating a grammar token when the new element is visited by a form interpretation algorithm (FIA). The composition of the grammar rule can be controlled as the grammar token is added to the grammar rule being constructed using values of the attributes. In one embodiment, the method can be used to create a phonebook and a grammar to access the phonebook by repeatedly visiting a form containing the grammar rule with attributes that enable generating the baseform from the referenced recording.

In a second aspect of the invention, a system having an automatic speech recognition application can include a memory for storing a list of user utterances and associated grammars and a processor coupled to the memory. The processor can be programmed to record a user utterance, generate a baseform using the user utterance, create a grammar rule using the baseform, and bind the grammar rule in a grammar document of a voice extensible markup language program.

In a third aspect of the invention, a computer program has a plurality of code sections executable by a machine for causing the machine to perform certain steps as described in the method and systems outlined in the first and second aspects above.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
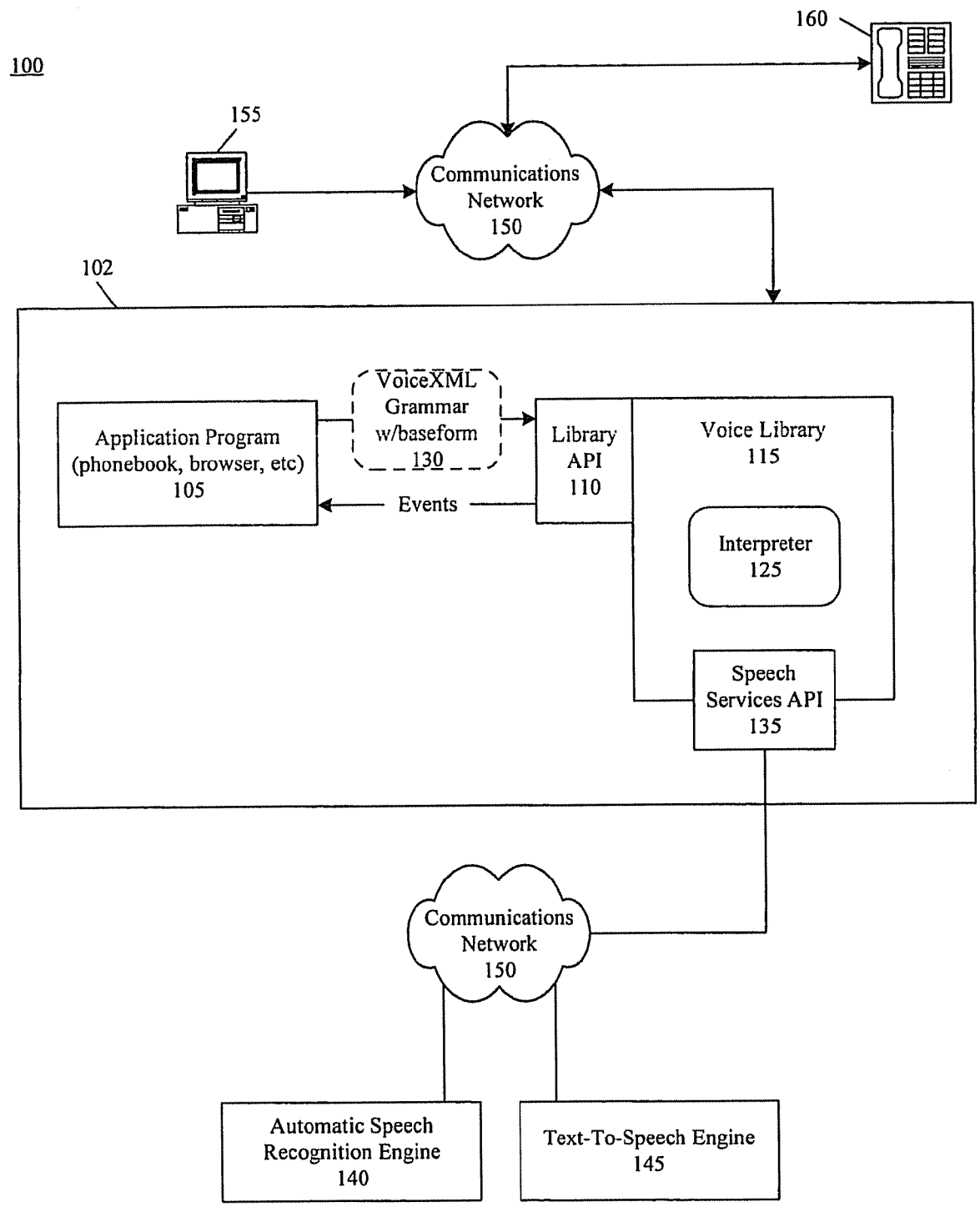
FIG. 1 is a schematic diagram illustrating a system for use in voice-enabling an application program in accordance with one embodiment of the present invention.

FIG. 1 is a schematic diagram illustrating a system 100 for use in voice-enabling an application program in accordance with one embodiment of the present invention. As shown, the system 100 can include a computer system 102 having an application program (application) 105 and a voice library 115. The system 100 further can include speech processing resources such as an automatic speech recognition (ASR) engine 140 and a text-to-speech (TTS) engine 145. As shown, the voice library 115 can run in the same address space as the application 105.

The computer system 102 can be a server for hosting one or more applications such as voice browsers, interactive voice response systems, voice servers, or the like. For example, in one embodiment, the application 105 can be a phonebook, a visual browser, or other application, that is to be voice or speech enabled. Accordingly, the application 105 can function as a multimodal browser once an interpreter 125 is instantiated. In another embodiment, the application 105 can be a voice server. In that case, the interpreter 125 can function as a voice browser. It should be appreciated, however, that the application 105 and the voice library 115 need not be located within the same information processing system. For example, each can be located within one or more different information processing systems communicatively linked via a suitable communications network. In one embodiment, the application 105 can be disposed within a user computing machine while the voice library 115 can be disposed in a network computing machine that is remote from the user machine.

The voice library 115 can include modules configured to perform the various functions described herein. In one embodiment, the voice library 115 can include a function for instantiating an interpreter 125 upon request of the application 105. The voice library 115 can include a library application programming interface (API) 110 through which the application 105 and the voice library 115 can communicate. As such, the library API 110 provides the application 105 with access to the functions of the voice library 115.

The application 105 can call a function in the voice library 115 via the library API 110 to instantiate the interpreter 125. In one embodiment, the interpreter 125 can function as a voice markup language interpreter. The interpreter 125 can be configured to parse and render any of a variety of voice markup languages, such as Voice Extensible Markup Language (VoiceXML) or any subset, superset, or derivative thereof.

The application 105 further can invoke another function referred to as "addLink". The addLink function of the voice library 115 can pass a VoiceXML fragment or VoiceXML grammar 130, generated in conjunction with the application 105, to the interpreter 125. The grammar 130 can specify one or more grammars with which speech inputs to the application 105 can be matched. That is, the interpreter 125 can match speech inputs received from the application 105 with command and control and content navigation (C3N) grammar(s) or other existing grammar rules. Upon detecting a match, the interpreter 125 can generate one or more events that are sent back to the application 105 in accordance with a new or modified grammar.

As noted, the system 100 can include speech resources, such as the ASR engine 140 configured to convert speech to text and the TTS engine 145 for generating synthetic voice from text. Notably, an audio playback system (not shown) can be included for playing recorded portions of audio if so desired. The interpreter 125 can manipulate the speech resources through the speech services API 135. This allows the interpreter 125 to be implemented independently of the speech resources, thereby facilitating the use of speech resources from different vendors.

While the application 105 and the interpreter 125 can function in a cooperative manner, the ASR engine 140 and the TTS engine 145 need not be part of the same system. That is, in one embodiment, the processing resources can execute in one or more other computer systems. Such computer systems can be proximate to, or remotely located from the computer system 102. For example, the speech resources can be provided as individual services that are accessible to the interpreter 125 and application 105 via a communications network 150, which can include, but is not limited to, a local area network, a wide area network, the public switched telephone network, a wireless or mobile communications network, the Internet, and/or the like. Still, in another embodiment, the resources can be located within a same computer system as the application 105 and/or the interpreter 125.

In operation, one or more instances of the interpreter 125 are created through function calls from the application 105 to the voice library 115. Once created, the application 105 can access the speech resources via the interpreter 125. That is, the interpreter 125 can render voice markup languages and access the ASR engine 140 and the TTS engine 145. Accordingly, voice services can be provided to a user accessing the computer system 102 via a telephone 160 or a computer system 155 over another communications network 150. C3N grammars can be provided or specified by the application 105 to the interpreter 125 through the passing of the VoiceXML fragment 130. Information indicating matches to user speech, such as application 105 commands or content navigation commands (i.e. selections of hyperlinks), can be passed back to the application 105 from the interpreter 125 as one or more events.

In a specific embodiment, a system utilizing a VoiceXML program can "record" a grammar and also reference or bind the grammar. In order to record a grammar rule in accordance with an embodiment of the present invention, a new element to VoiceXML is introduced, namely the <acbf> (for acoustic baseform) elements. The acoustic baseform element <acbf> has attributes that enable generating a baseform from a referenced recording to create or add to an existing grammar rule. Each time the <acbf> element is visited by the FIA (the interpreter 125, for example), a grammar "token" is created. The value of the attributes controls the composition of the rule as the token is added to the rule being constructed. The <acbf> attributes can include:

- expr—an ecmascript expression that resolves to an audio recording object that was created by a <record> element.
- grammar-rule—specifies the name of a rule in a dialog scope. If a rule with that name doesn't exist, one is created.
- tagexpr—contains an ecmascript expression that is evaluated to produce a semantic interpretation tag for the phrase.
- composition—specifies how this token is added to the rule. Allowed values are "alternative" and "sequence".
- weight—a floating point number that indicates the likelihood that an alternative will be spoken. (optional)
- group—Starts or stops a group. Allowed values are "begin" and "end".
- optional-group—Starts or stops an optional group. Allowed values are "begin" and "end".
- repeat—Specifies the number of times to repeat an item. Allowed value uses the Speech Recognition Grammar Specification (SRGS) XML format, "n-m", where n and m can be integer literals or ecmascript variables that evaluate to integers.

In a phonebook example, the form below could be visited multiple times to create a phone book and a grammar to access phone book entries:

```
<form id="namegram">
    <record id="nickname" >
        <prompt>Say a name</prompt>
    </record>
    <acbf expr="nickname" grammar-rule="name-in-book" operator="alternative"
tagexpr="getNextPhonebookKey( )">
        <field name="number">
            <prompt>Say the phone number for <audio expr="nickname"/>
</prompt>
            <grammar><ruleref uri="#phonenumber"/></grammar>
        </field>
        <filled>
            <submit    namelist="nickname$.tag   number"   next="#namegram"
method="post">
        </filled>
</form>
```

In the binding or referencing of the grammar rule, the computer system 102 or a VoiceXML processor maintains a grammar document implied by the set of rules in a dialog context using a variable dialog.grammar. The dialog.grammar variable is also an array where each member of the array is a structure that contains a rule name and a rule, e.g. dialog.grammar[1].rulename and dialog$.grammar[1].rule. An application author can further manipulate that variable, modify rules, or add entirely new rules. The rules in dialog.grammar are not activated (or even validated) until referenced by a grammar in the document.

In the example VoiceXML form below, the user can say "Dial 555-1212" or "Call John Smith". The latter matches the rule "name-in-book" rule that was created in dialog.grammar using the previous form. The VoiceXML form:

```
<form id="phonebook">
    <field name="cmd">
        <grammar>
            <one-of>
                <item>Dial</item>
                <item>Call</item>
            </one-of>
            <one-of>
                <item><ruleref uri="phonenumber"/></item>
                <item><ruleref uri="#name-in-book"
type="ibmacbf/x/item>
            </one-of>
        </grammar>
    </field>
</form>
```

Figure 2:
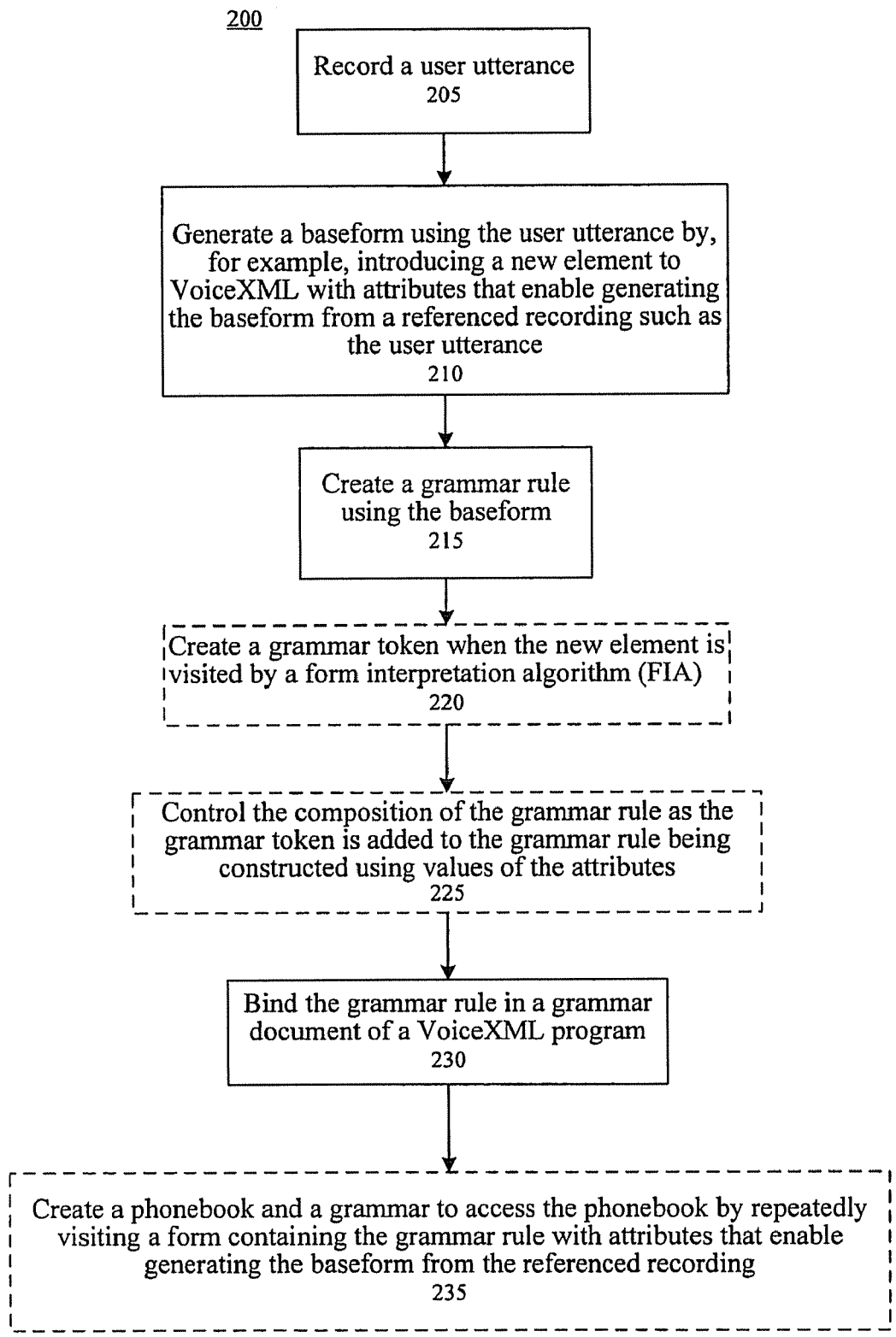
FIG. 2 is a flow chart illustrating a method of voice-enabling an application program that can build grammars using baseforms in accordance with an embodiment of the present invention.

Referring to FIG. 2, a method 200 of building a grammar with baseforms generated dynamically from user utterances can include the step 205 of recording a user utterance, generating a baseform using the user utterance at step 210, creating or adding to a grammar rule using the baseform at step 215, and binding the grammar rule in a grammar document of a voice extensible markup language program at step 230. Generating a baseform can optionally include introducing a new element to VoiceXML with attributes that enable generating the baseform from a referenced recording, such as the user utterance. The method 200 can further include the step 220 of creating a grammar token when the new element is visited by a form interpretation algorithm (FIA). The composition of the grammar rule can be controlled at step 225 as the grammar token is added to the grammar rule being constructed using values of the attributes. In one embodiment as shown in block 235, the method 200 can be used to create a phonebook and a grammar to access the phonebook by repeatedly visiting a form containing the grammar rule with attributes that enable generating the baseform from the referenced recording.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system, comprising:
   a memory for storing a list of user utterances and associated grammars;
   a processor coupled to the memory, wherein the processor is programmed to:
      record a user utterance;
      generate a baseform using the user utterance, wherein the processor is programmed to generate the baseform using an element in a voice extensible markup language (VoiceXML), the element comprising attributes that enable generating the baseform from a referenced recording;
      create a created grammar rule using the baseform and/or adding to an added-to grammar rule using the baseform;
      bind the created grammar rule and/or the added-to grammar rule to a grammar document of a VoiceXML program; and create a user-accessible application and a grammar to access the user-accessible application by repeatedly visiting a form containing the created grammar rule and/or the added-to grammar rule.

2. The system of claim 1, wherein the referenced recording comprises a recording of the user utterance.

3. The system of claim 1, wherein creating the created grammar rule and/or the added-to grammar rule comprises using values of the attributes.

4. The system of claim 1, wherein the processor is further programmed to create a grammar token when the element is visited by a form interpretation algorithm.

5. The system of claim 4, wherein the processor is further programmed to control a composition of the created grammar rule and/or the added-to grammar rule as the grammar token is added to the created grammar rule and/or the added-to grammar rule.

6. The system of claim 1, wherein the the user-accessible application is a phonebook.

7. A physical computer memory product, having stored thereon a computer program having a plurality of code sections executable by a machine for causing the machine to perform acts of:
recording a user utterance;
generating a baseform using the user utterance and an element of a voice extensible markup language (VoiceXML), the element comprising attributes that enable generating the baseform from a referenced recording;
creating a created grammar rule using the baseform and/or adding to an added-to grammar rule using the baseform;
binding the created grammar rule and/or the added-to grammar rule to a grammar document of a VoiceXML program; and
creating a user-accessible application and a grammar to access the user-accessible application by repeatedly visiting a form containing the created grammar rule and/or the added-to grammar rule.

8. The computer memory product of claim 7, wherein the referenced recording comprises a recording of the user utterance.

9. The computer memory product of claim 7, wherein creating the created grammar rule and/or the added-to grammar rule comprises using values of the attributes.

10. The computer memory product of claim 7, wherein the machine-readable storage further comprises code sections for causing the machine to create a grammar token when the element is visited by a form interpretation algorithm.

11. The computer memory product of claim 10, wherein the machine-readable storage further comprises code sections for causing the machine to control a composition of the created grammar rule and/or the added-to grammar rule as the grammar token is added to the created grammar rule and/or the added-to grammar rule.

12. The computer memory product of claim 7, wherein the the user-accessible application is a phonebook.

13. A method of building grammar with baseforms generated dynamically from user utterances, the method comprising acts of:
recording a user utterance;
generating, using at least one processor, a baseform using the user utterance and an element of a voice extensible markup language (VoiceXML), the element comprising attributes that enable generating the baseform from a referenced recording;
creating a created grammar rule using the baseform and/or adding to an added-to grammar rule using the baseform;
binding the created grammar rule and/or the added-to grammar rule to a grammar document of a VoiceXML program; and
creating a user-accessible application and a grammar to access the application by repeatedly accessing the created grammar rule and/or the added-to grammar rule.

14. The method of claim 13, wherein the referenced recording comprises a recording of the user utterance and the at least one processor is a processor of an interactive voice recognition system.

15. The method of claim 13, wherein creating the created grammar rule and/or the added-to grammar rule comprises using values of the attributes.

16. The method of claim 13, further comprising acts of creating a grammar token when the element is visited by a form interpretation algorithm.

17. The method of claim 16, further comprising acts of controlling a composition of the created grammar rule and/or the added-to grammar rule as the grammar token is added to the created grammar rule and/or the added-to grammar rule.

18. The method of claim 13, wherein the user-accessible application is a phonebook.

* * * * *